United States Patent [19]

Leonard et al.

[11] Patent Number: 5,464,577
[45] Date of Patent: Nov. 7, 1995

[54] METHOD OF THICKNESS CONTROL FOR DIES

[75] Inventors: William K. Leonard, River Falls, Wis.;
Stephen W. Mohn, St. Paul, Minn.;
Timothy J. Edman, Stillwater, Minn.;
Philip D. Schiller, Oakdale, Minn.

[73] Assignee: Minnesota Mining and Manufacturing Company, St. Paul, Minn.

[21] Appl. No.: 177,152

[22] Filed: Jan. 4, 1994

[51] Int. Cl.$^6$ ..................................... B29C 47/90
[52] U.S. Cl. .................. 264/40.5; 118/410; 264/40.7; 425/141; 425/466
[58] Field of Search .................. 264/40.5, 40.7, 264/176.1, 171; 425/461, 141, 140, 462, 466; 118/410, 411

[56] References Cited

U.S. PATENT DOCUMENTS

| | | | |
|---|---|---|---|
| 1,715,859 | 6/1929 | Norton | 425/466 |
| 2,938,231 | 5/1960 | Lowey, Jr. | |
| 3,102,302 | 9/1963 | Moore | 425/466 |
| 3,122,784 | 3/1964 | Jolliffe | |
| 3,464,087 | 9/1969 | Koch | |
| 3,508,947 | 4/1970 | Hughes | |
| 3,523,987 | 8/1970 | Camhi et al. | 264/39 |
| 3,600,750 | 8/1971 | Stroszynski | |
| 3,649,147 | 3/1972 | Fritsch | 425/461 |
| 3,819,775 | 6/1974 | Mules | 264/40 |
| 3,940,221 | 2/1976 | Nissel | 425/141 |
| 4,182,259 | 1/1980 | Garner et al. | 118/712 |
| 4,251,566 | 2/1981 | Gingerich | 427/10 |
| 4,364,722 | 12/1982 | Phipps | 425/461 |
| 4,464,104 | 8/1984 | Gneuss | 425/466 |
| 4,514,348 | 4/1985 | Iguchi et al. | 264/40.1 |
| 4,529,103 | 7/1985 | Drzevitzky et al. | 118/410 |
| 4,533,308 | 8/1985 | Cloeren | 425/131.1 |
| 4,594,063 | 6/1986 | Reifenhauser et al. | 425/141 |
| 4,732,776 | 3/1988 | Boissevain | 427/10 |
| 4,871,493 | 10/1989 | Goto | 264/40.6 |
| 4,984,533 | 1/1991 | Takahashi et al. | 425/466 |
| 4,990,078 | 2/1991 | Tomita | 425/466 |
| 5,067,432 | 11/1991 | Lippert | 425/461 |
| 5,147,462 | 9/1992 | Wollam | 118/679 |

FOREIGN PATENT DOCUMENTS

| | | | |
|---|---|---|---|
| 1479931 | 5/1969 | Germany | |
| 2359413 | 6/1975 | Germany | 118/410 |
| 3531005 | 3/1986 | Germany | |
| 60-210418 | 10/1985 | Japan | |
| 818889 | 4/1981 | U.S.S.R. | 425/466 |
| 821179 | 4/1981 | U.S.S.R. | 425/466 |
| 821178 | 4/1981 | U.S.S.R. | 425/466 |
| 1232292 | 5/1986 | U.S.S.R. | 118/410 |
| 357446 | 10/1931 | United Kingdom | |
| 2058663 | 4/1981 | United Kingdom | |
| 2150051 | 6/1985 | United Kingdom | 118/410 |

OTHER PUBLICATIONS

Research Disclosure, Aug. 1979, Havant, UK, pp. 424–425, Anonymous, "Lip Control".

*Primary Examiner*—Jeffery R. Thurlow
*Attorney, Agent, or Firm*—Gary L. Griswold; Walter N. Kirn; Charles D. Levine

[57] ABSTRACT

An easily controllable method to adjust a die slot exit gap to produce an accurately controlled flow from the slot exit across the width of a die provides movable back seats at the back of the die that cause front and back portions of die plates to move simultaneously to produce a change in the die slot exit gap. At least one actuator is located between the front and back seats of the die to increase or reduce the actuator length to bend the first plate around the front seat thereby to increase or decrease the first exit gap.

6 Claims, 3 Drawing Sheets

METHOD OF THICKNESS CONTROL FOR DIES

TECHNICAL FIELD

This invention relates to dies for sheet or film making from a flowable material and to coating dies for forming continuous coatings on substrates. More particularly, this invention relates to a method of controlling the profile across the die width.

BACKGROUND OF THE INVENTION

Extrusion dies form a flowable material, such as a thermoplastic melt, a solvent solution, an emulsion, a radiation curable oligomer and the like, into an unsupported sheet, film, or web. In a common application in the plastics industry, a molten, pressurized stream of a thermoplastic material is moved into an inlet, through an internal distributing cavity, and discharged from an exiting slot to form a ribbon of material which is solidified to continuously form a sheet, film, or web which can be wound into a roll. The extrusion die takes a stream of flowable material and spreads it internally to form a discharging ribbon with a large width-to-thickness ratio.

Dies can also be used to coat. Coating is the process of replacing the gas contacting a substrate, usually a solid surface such as a web, by a layer of fluid. Sometimes, multiple layers of a coating are applied on top of each other. Coatings may also be applied to substrates other than continuous webs such as discrete parts or sheets cut from a web which are passed singularly or in arrays through the coating station. After the deposition of a coating, it can remain a fluid such as in the application of lubricating oil to metal in metal coil processing or the application of chemical reactants to activate or chemically transform a substrate surface. Alternatively, the coating can be dried if it contains a volatile fluid to leave behind a solid coat such as a paint, or can be cured or in some other way solidified to a functional coating such as a release coating to which a pressure sensitive adhesive will not aggressively stick.

It is known to provide dies with various manual mechanical, thermomechanical, piezomechanical, magnetostrictive, or motor driven actuators for moving the die lips to provide control of the film, sheet, or coating thickness. This control is produced by controlling the local flow rate of fluid exiting across the width of the die from the slot exit of the discharge slot at the external surface of the die body by adjusting the exit gap. It is known, as shown in FIG. 1, to use a plurality of spaced actuators (not shown) along the movable part of the top die lip across the die width. Each actuator can be adjusted individually to apply an individual displacement force ($F_1, F_2, F_3, \ldots, F_n$) locally to the top lip relative to the opposing fixed bottom lip to control the die slot exit opening. Since at any point across the die width the local discharge rate from the die exit depends upon the local gap, among other factors, the uniformity of flow discharge from the die exit slot can be controlled across the width.

Usually, control is accomplished by measuring the thickness of the film or coating at various points across its width with a thickness gage such as beta-ray, X-ray, or light absorption gage. With the information from such a measurement, an operator can manually adjust a bolt type actuator bearing against the lip. Alternatively, a control system can signal the activation of actuators which bear against the lip or which rotate bolts that bear against the lip. The manual adjustment of die lip flexing bolts by an operator requires skill and experience. It has been shown that the quality of product extruded or coated can be improved by a closed loop control system to replace the manual operator adjustment.

U.S. Pat. No. 2,938,231 discloses thermally expanding and contracting die bolts to slide the lips of a thermal plastic extrusion die to control the slot exit size. The thermal bolt actuators are directly coupled to the die lips. U.S. Pat. No. 3,940,221 discloses an improvement which is used in plastic film extrusion. It provides for both heating and forced cooling on the die lip flexing bolts in conjunction with a continuous film caliper system to control the extruded film thickness across the width of the film. The die slot exit control is directly controlled by bolts that are directly attached to the lip or bear against it.

U.S. Pat. No. 3,122,784 teaches using a plurality of controlled adjustment motors mechanically coupled to lip displacement bolts on a web extrusion die. The motors respond to signals generated by a traversing thickness sensor, and control signals are generated to drive the motors. U.S. Pat. No. 3,819,775 discloses a method in which the die lips are divided into a large number of thermally isolated control zones. The extruded polymer film thickness profile is controlled by selectively controlling the die lip section temperatures. The die lips form the walls of the slot exit so that their temperature influences the local flow properties of the film and the local flow rate exiting the die slot.

U.S. Pat. No. 4,514,348 discloses a combined means for adjusting the die slot exit with a plurality of bolts attached to the die lip across the die width using motor driven bolt rotations for coarse adjustment and thermal expansion or contraction of the bolts for fine adjustment.

U.S. Pat. No. 4,594,063 teaches using piezoelectric or magnetostrictive elements bearing against a flexible die lip to adjust the slot exit and control an extruded film.

U.S. Pat. No. 4,871,493 teaches using die lip temperature profiling by lip heaters controlled by the signals from both the extruded thermoplastic temperature and caliper profiles across the die width.

In these known systems, the die slot exit size, also called a gap, is changed by acting directly on the die lips with an attached actuator or by influencing the flow between the die lips by changing the lip temperature. These systems are effectively used for caliper control in the extrusion of single layers. They are also successfully used to control the cross web caliper of the coating applied to substrates. In these situations, only one die exit is present. However, when simultaneous multilayer die coating or simultaneous multilayer extrusion is desired, multiple die lip pairs and multiple die slot exits need to be controlled. Here, the mechanical attachment of actuators or heaters becomes difficult to practically accomplish when three or more coextrusions or simultaneous coatings are desired. Designing and constructing dies so that attachments can be made to at least one lip of the slot exits of three or more exits is impractical.

The use internal choker bars for caliper profile adjustment across the width of a die is known in thermoplastic extrusion, and the use of internal wedges and vanes is described in U.S. Pat. No. 3,464,087 and U.S. Pat. No. 4,533,308. While these mechanisms are useable on multilayer extrusion dies, they are mechanically complex, and use moveable members that extend into high pressure fluid regions within the die body, and present sealing and leakage problems. Other ways of adjusting the cross width flow profile of multi-slot dies are desired.

With simultaneous multilayer slide curtain coating dies as exemplified by U.S. Pat. No. 3,508,947 and as used by the photographic film manufacturing industry, the preferred stacked slot geometry makes it difficult to build moving actuators attached to the lips that change the slot exit dimensions. No such designs are known. Currently, the uniformity of the coated layers depends on the uniformity and precision of making and assembling these dies. This often requires time-consuming ultra-precise, labor intensive final machining by highly skilled personnel. Another practical consideration is that many single layer coating die installations have no means for adjusting the cross web coating profile on-line in response to a control system. A die modification to allow on-line control that can easily be adapted to existing dies is desirable.

In the assembly of single layer dies, it is known that differential torquing of the die plate clamping bolts may affect the uniformity of the die slot exit. The rotation of die bolts to adjust bolt tension levels is not very controllable. High normal forces at threaded interfaces commonly cause stick-slip rotational movements of the bolts. This makes continuously variable and small adjustments to bolt tension difficult to accomplish reliably. This technique has not been successfully used for adjustment of coating profiles during operation.

SUMMARY OF THE INVENTION

This invention is an easily controllable system which adjusts the die slot exit gap to produce an accurately controlled flow from the slot exit across the width of a die. This is accomplished without attaching heaters to the die lips and without using any actuator that bears on or is attached to the die lips. Rather, this is accomplished by deforming the plates which form the die at a location spaced away from the die lips. Seats at the back of the die are deformed to cause the front and back portions of the die plates to move simultaneously to change the die slot exit gap.

The die includes a first plate having a lip and a second plate having a lip and contacting the first plate at a front seat and a back seat which is further from the lips than the front seat. The assembled plates form a first slot through the die which terminates at its exit at the first and second lips. At least one actuator is located between the front and back seats. The actuator can increase or reduce its length to bend the first plate around the front seat thereby to increase or decrease the first exit gap.

A plurality of actuators that are independently and non-uniformly operable to produce local changes in the first exit gap in some limited region across the width of the die can be used. The actuators can be located in a cutout in the second plate formed under the back seat. Alternatively, the actuator can be located adjacent an outer surface of the first plate.

The die also can be part of a system for automatically controlling the extruded profile of an extruded film. This system can include a sensor which measures the profile of the film and a controller which communicates with the sensor and compares the measured profile to a known target profile and signals the actuators to change their length to change the profile. Additionally, the die can include three or more plates, to extrude two or more layers, with the slot exit of each layer being controllable independently of the slot exit of the other layers.

DETAILED DESCRIPTION

Figure 1:
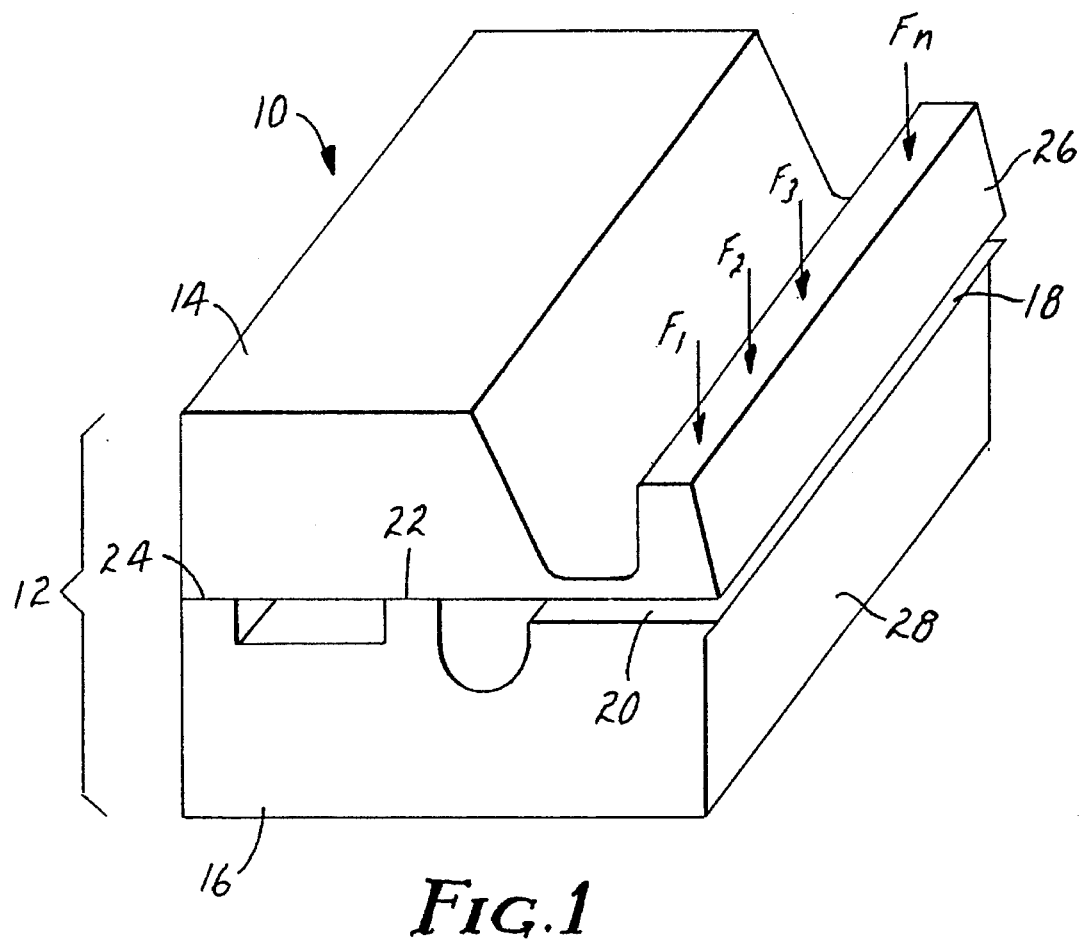
FIG. 1 is a perspective view of a known die.

FIG. 1 shows a section of known coating die, an extrusion die 10, showing the common features for flexing the die lip to adjust the profile of the fluid flow from the die across its width. A flowable material is forced to flow into the die body 12, which has a first half or top plate 14 and a second half or bottom plate 16. The material exits from the die slot exit 18 (also known as an orifice) of the slot 20. The top and bottom plates 14, 16 mate at die seats 22, 24. The portions of the die body 12 adjacent the exit 18 and to the right of the die seat 22 are known as the top die lip 26 and the bottom die lip 28. Known technology uses a plurality of mechanical actuators (not shown) to apply pushing or pulling forces $F_1$, $F_2$, $F_3$, ..., $F_n$ spaced across the width of the die. These actuators must physically attach to at least one die lip or cause movement of some physical linkage that bears against or is attached to the die lip. Known actuators include translating bolts, thermally expanding bolts, piezoelectric actuators, magnetostrictive actuators, motor driven actuators, and hydraulic actuators. Movement by these devices changes the exit 18 size, also called the gap. Non-uniform application of the forces can produce local changes in the gap in some limited region across the width of the die. Because the local flow rate from the exit 18 is influenced by the local gap, the material discharge rate may be adjusted across the width of the die.

Figure 2:
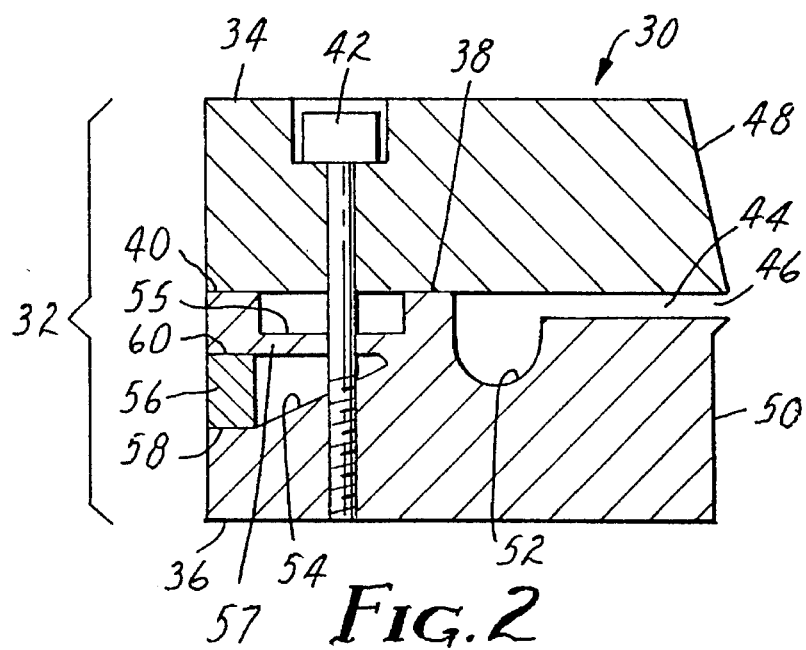
FIG. 2 is a cross-sectional view of a coating die of the present invention.

FIG. 2 is a cross section of a die 30 according to one preferred embodiment of the invention. The die body 32 includes a top plate 34 and a bottom plate 36 which contact each other and preferably are clamped tightly together at a front seat 38 and a back seat 40 by a plurality of die clamping bolts 42 across the width of the die body 32. The top plate 34 mates on the bottom plate 36 at the seats 38, 40 to form a slot 44 through the die body 32. Flowable material can be forced from the interior of the die body through the slot 44. The slot 44 terminates and is bounded at its exit 46 by top and bottom lips 48, 50 which are the ends of the top and bottom die plates 34, 36 to the right of the front seat 38. Often an internal cavity 52 inside the die body 32 facilitates the spread and flow of material from a feed port (not shown) to the slot 44 across the width of the die. If the cavity 52 is present, the die lips are considered to be the plate extensions to the right of the cavity.

A cutout 54 is formed in the die plate 36 under the back seat 40 of the bottom plate 36 along at least part of the width of the die. A plurality of actuators 56 are inserted into this cutout 54 between a lower actuator seat 58 and an upper actuator seat 60. The actuators 56 can increase or reduce their length to move the back seat 40 away or toward an actuator seat 58. It is preferred to have a one-to-one pairing of actuators 56 and the clamping bolts 42. All the known types of mechanical moving actuators can be used. The mechanical design and materials of construction of the bottom plate 36 adjacent and beneath the actuator seat 58 should be relatively rigid, unyielding, and unmoving to permit movement of the actuator 56 to move the seat 40 with respect to the seat 38.

When the actuator 56 lengthens, the top plate 34 at the back seat 40 moves up and pivots around the front seat 38 forcing its top lip 48 downward to close the exit 46 gap. Similarly, when the actuator 56 shortens, the top plate 34 at the back seat 40 moves down and pivots around the front seat 38 forcing its top lip 48 upward to open the exit 46 gap. Non-uniform application of only some actuators 56 can produce local changes in the exit gap in some limited region across the width of the die. In this manner, because the local flow rate from the exit 46 is influenced by the local gap, the material discharge rate can be adjusted across the width of the die.

The cutout 54 can be shaped so that the clamping force of the die bolts 42 acting through the back seat 40 and the upper actuator seat 60 holds the actuators 56 in compression. An additional cutout 55 is formed on the top of the bottom plate 36 to facilitate the compression. The cutout 55 is bounded by the two seats 38, 40 and a bridge 57. The increase or decrease of the linear distance between the actuator seats 58, 60 caused by the actuators 56 causes changes in the stresses through all portions of the plates 34, 36 and bolts 42, and causes the elastic deformation of these pieces. To cause the movement of the top lip 48 relative to the bottom lip 50 to change die exit gap 46 may require that the bottom plate 36 design allow the front seat 38 to deform elastically while most of the bottom plate 36 remains stiff and relatively unbending. It also requires the die bolts to elastically stretch to avoid impeding movement of the top plate 34 in response to the movement of the actuator 56. Also, the top plate 34 should be rigid and stiff enough so that at least some portion of the movement of the seat 40 in conjunction with the clamping force of the die bolts 42 causes movement of top lip 48 with respect to the bottom lip 50 to change the exit 46 gap.

Alternatively, the actuators 56 can be located in cutouts under the front seat 38 (not shown) of the bottom plate 36. The actuators 56 can increase or reduce their length to move the front seat 38 away or toward an actuator seat. When the actuator 56 lengthens, the top plate 34 at the front seat 38 moves up to pivot or bend around the back seat 40 forcing its top lip 48 upward to open the exit 46 gap. Similarly, when the actuator 56 shortens, the top plate 34 at the front seat 38 moves down to pivot around the back seat 40 forcing its top lip 48 downward to close the exit 46 gap.

In another alternative embodiment (not shown), the material under the seat 38 at which the actuators are not located could be more compressible than the surrounding material. This would cause the seat to move in response to actuator forces and to pivot the plate 34 to vary the exit gap.

Figure 3:
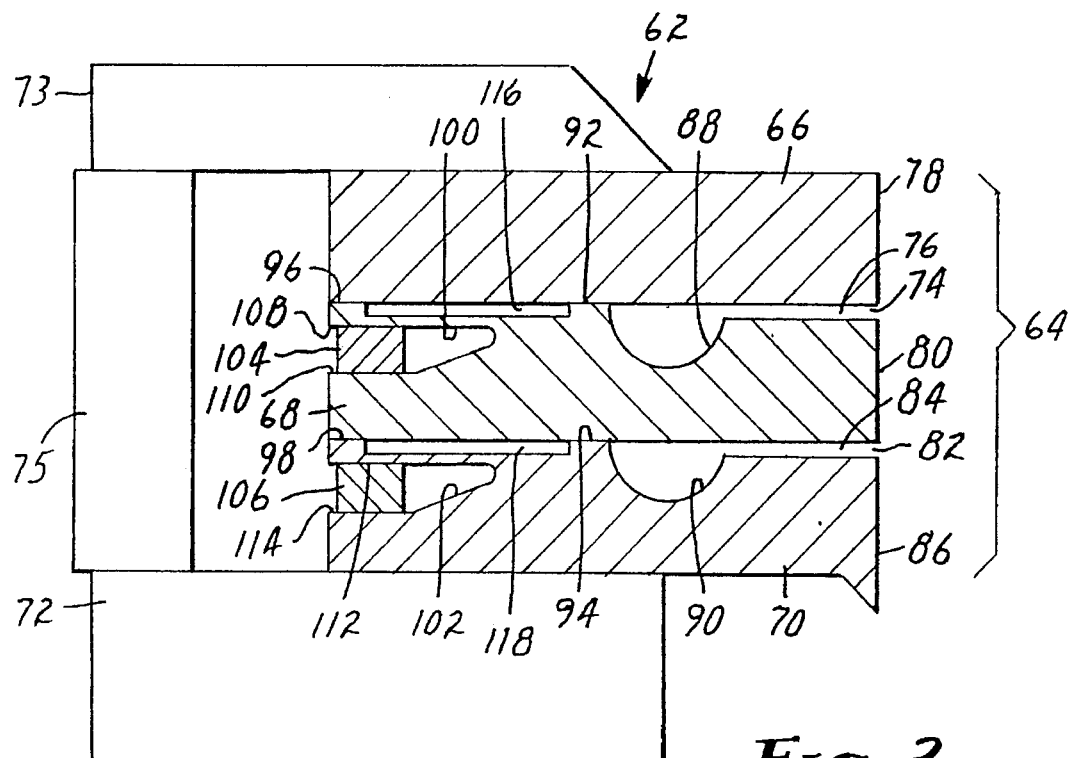
FIG. 3 is a cross-sectional view of a multilayer coating die according to another embodiment of the present invention.
Figure 5:
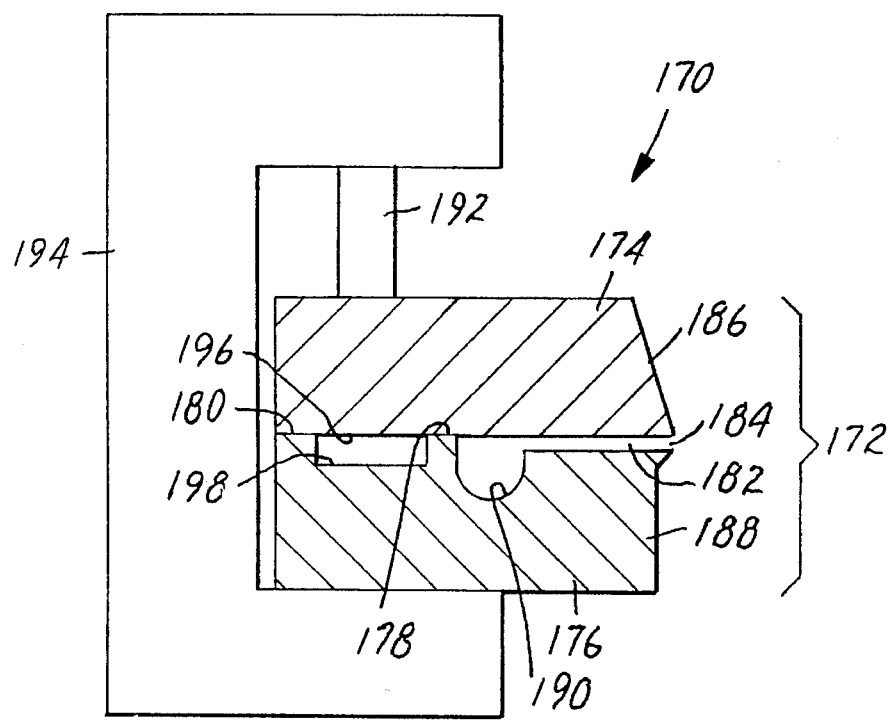
FIG. 5 is a cross-sectional view of an die according to another embodiment of the present invention.
Figure 4:
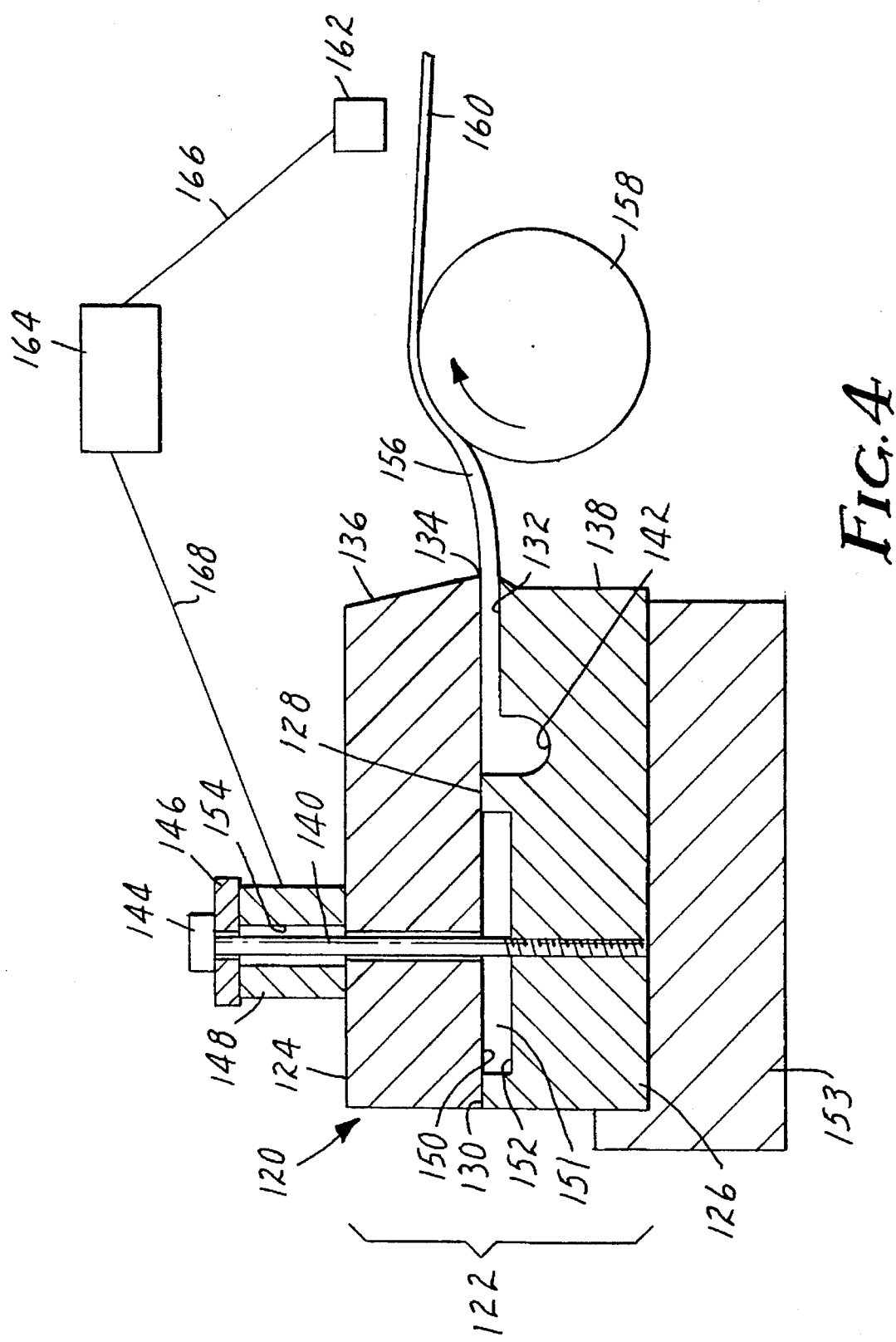
FIG. 4 is a cross-sectional view of a single layer die according to another embodiment of the present invention where the clamping bolts tension is continuously variable and showing a typical die and caliper measurement and control apparatus.

FIGS. 3–5 show additional embodiments using modifications of the die slot exit profile adjusting system. The operation of these embodiments is similar in general principle to that of the FIG. 2 embodiment. FIG. 3 shows a die 62 similar to that of FIG. 2 which has a different clamping mechanism and which can simultaneously coat multiple layers. Although the die 62 has two slots, any number of slots can be used and can have varying exit profiles. The die body 64 is made from three separate die plates 66, 68, 70. These plates are clamped together by a compressive force applied through support members 72, 73, and an attachment device 75 which applies clamping pressure between the supports 72, 73. One of the supports, the support 73 as illustrated, is somewhat flexible so that it may deform locally in response to forces applied by actuators.

A first material is forced from between the die plates 66, 68 out through the exit 74 of the slot 76 from between top and middle lips 78, 80. A second material can be simultaneously forced from between the die plates 68, 70 out through the exit 82 of the slot 84 from between middle and bottom lips 80, 86. The slots 76, 84 are fed from respective cavities 88, 90. A front seat 92 is present between the top and middle plates 66, 68, and a front seat 94 is present between the middle and bottom plates 68, 70. A back seat 96 is present between the top and middle plates 66, 68, and a back seat 98 is present between the middle and bottom plates 68, 70.

Cutouts 100, 102 are positioned in the plates 66, 68 beneath the respective back seats 96, 98. A plurality of actuators 104, 106 are inserted into the respective cutouts 100, 102. The actuators 104, 106 reside in contact with and between respective lower actuator seats 110, 114 and upper actuator seats 108, 112. The upper actuator seats 108, 112 maintain the actuators 104, 106 in compression by the clamping forces applied through the support members 72, 73. Additional cutouts 116, 118 are formed on the top of the middle and bottom plates 68, 70, respectively, to facilitate the compressive loading.

The actuators 104 are spaced across the width of the middle plate 68 to profile the exit 74 across the width of the die. The actuators 106 are spaced across the width of the bottom plate 70 to profile the exit 82 across the width of the die. The actuators 104, 106 may have their length adjusted manually or automatically in response to an automatic control system. Similar to the die in FIG. 2, the cross die gap profile of the exit 74 is controlled by the local movements of the seat 96 across the width of the die and the cross die gap profile of the exit 82 is controlled by the local movements of the seat 98 across the width of the die. With the proper mechanical design, the actuators 104, 106 can be made to operate to vary the profile of the exits 74, 82 almost completely independently of each other. Less than all of the slot exit profiles can be varied. Optimization of the physical dimensions of the various components could theoretically minimize the effects of changing the exit profile of one slot exit on other slot exits. Also, similar to the die of FIG. 2, the actuators can be located beneath the front seats.

FIG. 4 shows a section of a die 120 according to another embodiment of this invention. A die body 122 includes a top plate 124 and a bottom plate 126. The top and bottom plates 124, 126 mate at a front seat 128 and a back seat 130 and form a slot 132 having an exit 134. The top plate 124 has a top lip 136 and the bottom plate 126 has a bottom lip 138. The top and bottom plates 124, 126 are clamped together by a plurality of die bolts 140 spaced across the width of the die and located between the seats 128, 130. Material is forced into the die through a port (not shown), is spread across the width of the die 120 by a cavity 142, travels through the slot 132, and is forced to exit at the exit 134 of the slot.

Each bolt 140 is tightened so that its head 144 bears against a rigid washer 146 which bears against an actuator 148 which is located under the washer 146. Tightening the bolts 140 during assembly causes their shafts to be in tension and places the washers 146, the actuators 148, and the seats 128, 130 in compression. The die plate 126 can be rigidly fixed to a very rigid mounting plate 153. A cutout 151 leaves a gap between the faces 150, 152. Activation of the actuators 148 to lengthen them applies more tension to the bolts 140. This pulls the top plate face 150 which is between the seats 128, 130 toward the bottom plate face 152. In this embodiment, the actuators are located between the seats, rather than at one seat.

When the actuator 148 is activated to lengthen, more tension is applied to the bolts 140, and the top plate 124 is deformed toward the bottom plate 126 between the front and back seats 128, 130. In turn, the top lip 136 moves upward as the top plate 124 elastically bends in response to the greater tension. Similarly, when the actuator 148 shortens, the top plate 124 moves away from the bottom plate 126 between the front and back seats 128, 130 and the top lip 136 moves downward as the top plate 124 elastically unbends in response to the lesser tension.

Alternatively, if the bottom plate 126 were not rigidly attached to the mounting plate 153, then the application of additional forces via the bolts 140 would bend the top plate face 150 toward the face 152 and would also bend the bottom plate so its face 152 bends toward the face 150 to cause the top lip 136 to move upward and the bottom lip 138 to move downward. This widens the gap of the exit 134. Similarly, shortening the actuators 148 applies less tension to the bolts 140 and allows the top and bottom plates to elastically bend. This causes the top lip 136 to move downward and the bottom lip 138 to move upward to close the exit 134.

In this manner, by varying the lengthening of the actuators 148 across the width of the die 120, the exit 134 gap may be varied across the width of the die to correct flow rate variation. The actuator can be a cylindrical piezoelectric actuator with a hole 154 through the center to allow the bolt 140 to pass through it. Actuators of this type can be manufactured by Kinetic Ceramics of Hayward, Calif. Alternatively, the actuator could be an integral part of the bolt or could be any mechanism that produces variation of the tension in the clamping bolt shaft. The degree of bending of each die plate 124, 126, in response to clamping bolt tension and the amount of movement of the die lips depends upon the geometry and materials of construction of the plates. Other clamping mechanisms may be used instead of bolts to cause bending to one or both of plates 124, 126 between the seats 128, 130 to move the die lips relative to each other.

FIG. 4 also shows the overall apparatus which operates automatically to control the extruded profile of a plastic film across the width of the single layer die 120. The material is forced from the exit 134 as a continuous ribbon 156 which extends across the width of the die. The ribbon 156 then contacts a cooling roll 158 upon which it solidifies to form a film 160 which is pulled past a caliper sensor 162. The sensor 162 measures the caliper profile across the width of the film 160 and sends this information to a controller 164 through wires 166. The controller 164 compares the measured profile to a known target profile. Corrective adjustment signals are produced by the controller 164 and sent through wires 168 to the actuators 148 spaced across the width of the die 120. The actuators 148 then change length each according to its own signal from the controller 164, usually by differing amounts across the width of the die. This moves the die lips 136, 138 and changes the exit 134 gap across the width of the die. These changes change the local plastic flow rate across the width of the die.

FIG. 5 illustrates another clamping mechanism used with a die 170 in which actuators are located between the seats 180, 178. The die body 172 includes a top plate 174 and a bottom plate 176. The top and bottom plates 174, 176 mate and are clamped together at a front seat 178 and a back seat 180 and form a slot 182 having an exit 184. The top plate 174 has a top lip 186 and the bottom plate 176 has a bottom lip 188. Material is forced into the die through a port (not shown), is spread across the width of the die 170 by a cavity 190, passes through the slot 182, and is forced to exit at the exit 184.

Actuators 192 are spaced across the width of the die 170 and are located between a mounting structure 194 and the top die plate 174. A plurality of these actuators 192 are spaced across the width of the die 170. They are located to apply a compressive bending force to the top plate 174 between the seats 178, 180.

Activation of the actuators 192 to lengthen them applies more force to the top plate 174. This pushes the top plate face 196 which is between the seats 178, 180 toward the bottom plate face 198, which is between the seats 178, 180 and which is recessed within the bottom plate 176. This bends the top plate 174 so that its bottom side is bent to become relatively more convex or less concave, depending on its initial state. This moves the top lip 186 upward and causes the exit 184 gap to increase. Similarly, shortening the actuators 192 applies less force to the top plate 174. This causes the bending of the top plate 174 to cause the exit 184 gap to decrease. In this manner, by varying the length of the actuators 190 across the width of the die 170, the slot exit 184 gap may be varied across the width of the die 170 to correct flow rate variations. The preferred actuator 192 would provide both manual coarse adjustment of length and fine length adjustment in response to an automatic control system.

The use of movement of a die seat to produce movement of die lips or the bending of die plates between the seats to produce movement of the die lips can be used singularly or in combination with other known methods of moving die lips to produce exit gap changes. Many different types of control systems can produce corrective action of the actuators. All of the systems currently used for actuators directly linked to die lips in known automatic methods can be used.

Although the invention has been described and claimed using the terms upper, lower, top, and bottom to refer to various components, the orientation of the components can be changed and the dies can be at any orientation.

We claim:

1. A method of controlling a slot exit gap of a die, wherein the die comprises a first plate having a lip, and a second plate having a lip and contacting the first plate at first and second locations which extend across the width of the plates, wherein the first and second plates combine to form a slot and a cavity, wherein the first location is further from the lips than the die cavity and wherein the second location is further from the lips than the first location, to form a slot through the die which terminates and is bounded at its exit by the first and second lips, wherein the method comprises the step of deforming at least one of the first and second plates at the second location to provide relative pivoting of the first and second plates around the first location thereby to change the slot exit gap without bending the lips.

2. The method of claim 1 wherein the deforming step comprises applying a force to one of the first and second plates to bend at least one of the plates thereby to pivot that plate around the first location.

3. The method of claim 2 wherein the deforming step comprises applying a force at a plurality of locations along the width of the die to produce independent local changes in the exit gap in a portion of the width of the die.

4. The method of claim 2 wherein the deforming step comprises applying a force from within the die.

5. The method of claim 2 wherein the deforming step comprises applying a force from outside the die.

6. The method of claim 1 further comprising the step of automatically controlling the extruded profile of an extruded film across the width of the die by measuring the profile of the film, comparing the measured profile to a known target profile, and deforming the plates to change the exit gap change the profile of the extruded film to more closely resemble the known target profile.

* * * * *